United States Patent [19]

Ohshima et al.

[11] Patent Number: 5,355,355
[45] Date of Patent: Oct. 11, 1994

[54] ELECTRONIC FILE APPARATUS CAPABLE OF STORING CODE DATA AND IMAGE DATA INTO OPTICAL MEMORY

[75] Inventors: Ken Ohshima, Kawasaki; Takenori Osanai, Ebina, both of Japan

[73] Assignee: Kabushiki Kaisha Toshiba, Kawasaki, Japan

[21] Appl. No.: 812,860

[22] Filed: Dec. 23, 1991

Related U.S. Application Data

[63] Continuation of Ser. No. 607,625, Oct. 31, 1990, which is a continuation of Ser. No. 168,485, Mar. 15, 1988, abandoned.

[30] Foreign Application Priority Data

| Mar. 18, 1987 | [JP] | Japan | 62-63272 |
| Mar. 18, 1987 | [JP] | Japan | 62-63273 |
| Mar. 18, 1987 | [JP] | Japan | 62-63274 |

[51] Int. Cl.$^5$ ............................................. G11B 13/04
[52] U.S. Cl. ................................................... 369/14
[58] Field of Search ................. 369/14, 15, 47, 54, 369/58, 84, 85; 358/342, 335, 256

[56] References Cited

U.S. PATENT DOCUMENTS

| 4,490,747 | 12/1984 | Yokoyama | 369/14 |
| 4,604,653 | 8/1986 | Shimizu | 358/256 |
| 4,607,290 | 8/1986 | Murakami | 358/260 |
| 4,797,868 | 1/1989 | Ando | 369/44 |
| 4,816,925 | 3/1989 | Hayashi | 358/342 |
| 4,825,419 | 4/1989 | Ohtomo | 369/47 X |
| 4,843,484 | 6/1989 | Kanamaru et al. | 369/54 X |

FOREIGN PATENT DOCUMENTS

| 0122467A3 | 10/1984 | European Pat. Off. |
| 60-57558 | 4/1985 | Japan | 369/14 |
| 62-145591 | 6/1987 | Japan |
| 62-054329 | 8/1987 | Japan |
| 2157035A | 10/1985 | United Kingdom |

OTHER PUBLICATIONS

Suzuki et al., "Tele-Document Terminal—Electronic Filing Terminal for INS Model System", 418 Review of the Electrical Communication Laboratories, vol. 33, No. 2, Mar. 1985, Tokyo, Japan.

*Primary Examiner*—Hoa T. Nguyen
*Attorney, Agent, or Firm*—Finnegan, Henderson, Farabow, Garrett & Dunner

[57] ABSTRACT

An apparatus for recording and reproducing data on and from an optical memory has regions for recording data by light only. Code data and image data are processed from a memory within the apparatus. A first retrieval data is added to the code data and a second retrieval data is added to the image data, and the first retrieval data and code data and the second retrieval data and image data are recorded onto an optical memory. Either the first or second retrieval data is designated and depending upon the designation, either the code data corresponding to the first retrieval data or the image data corresponding to the second retrieval data is processed from the optical memory.

18 Claims, 5 Drawing Sheets

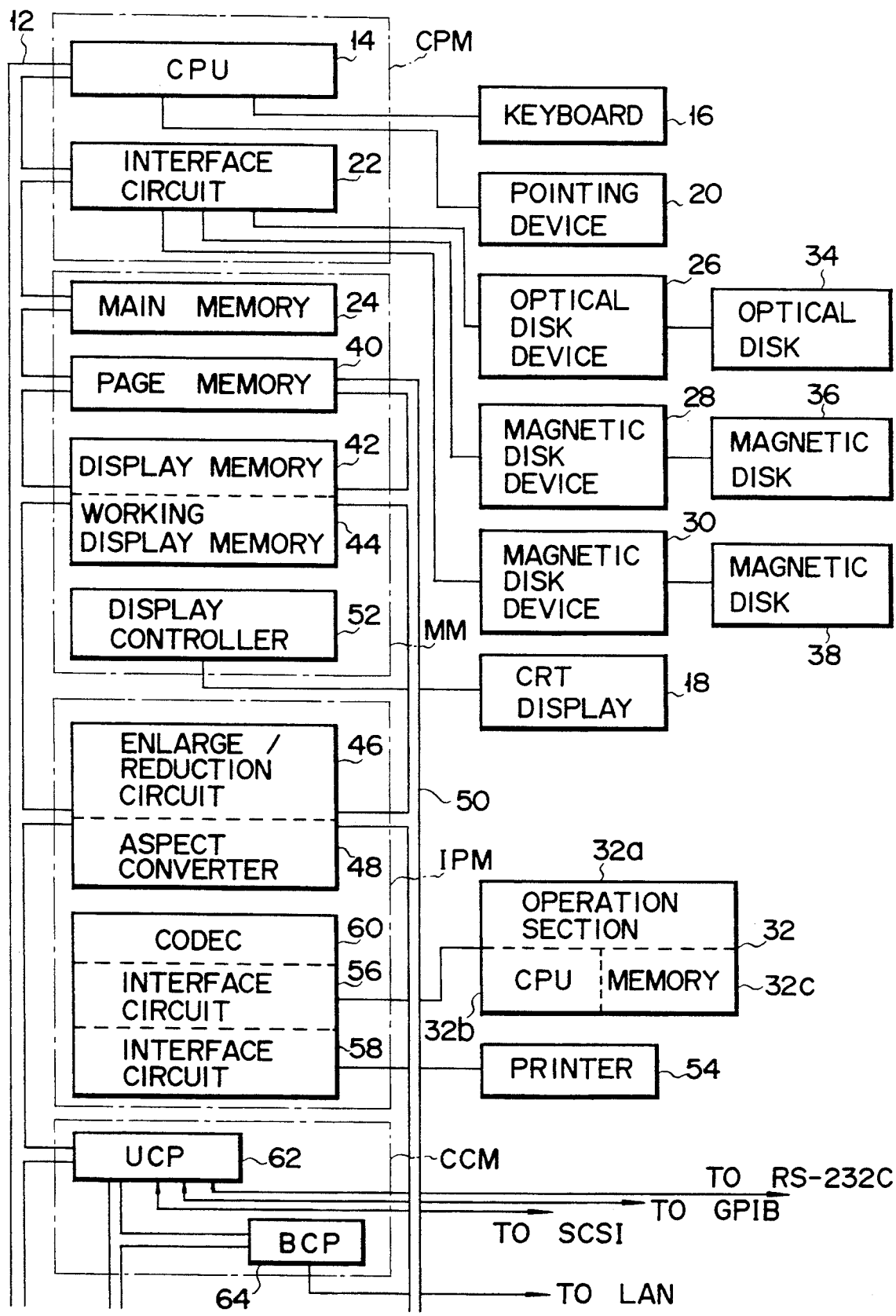
F I G. 1A

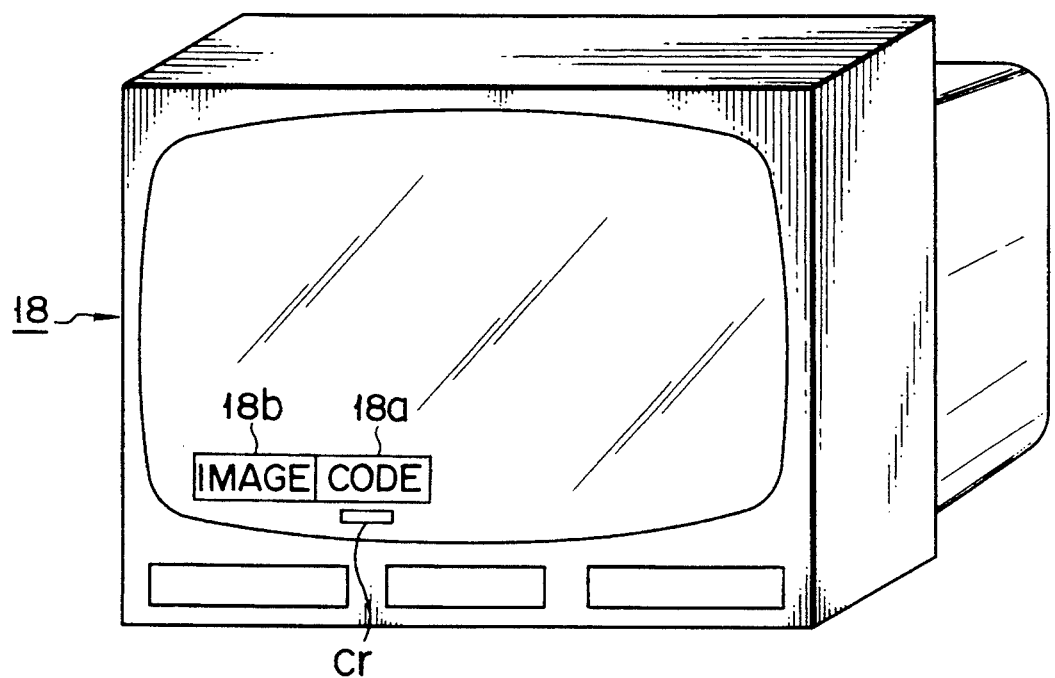
F I G. 1B
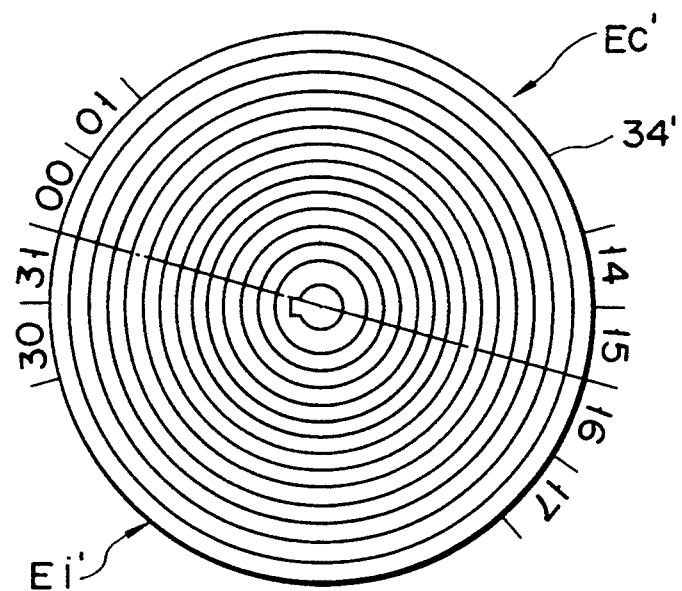
F I G. 2B

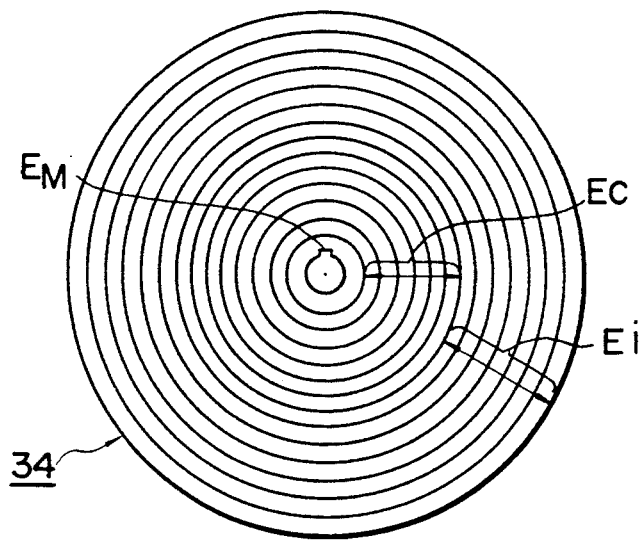
FIG. 2A
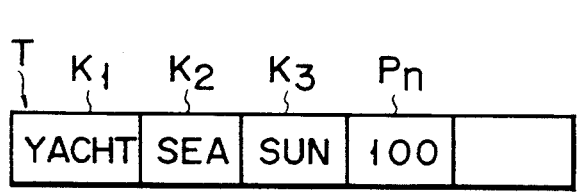
FIG. 3A
FIG. 3B
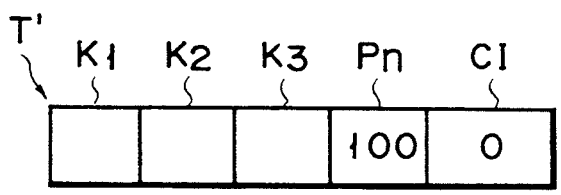
FIG. 6A
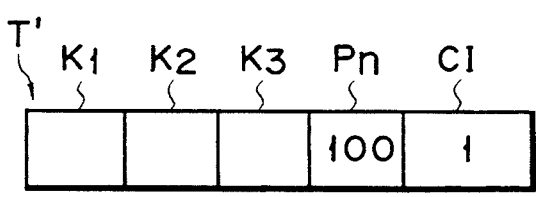
FIG. 6B

| NUMBER OF KEYS (Kn) | Kna | T1 | T2 | Cn | TS |
|---|---|---|---|---|---|
| VEHICLE | CHARACTER | VARIABLE ITEM | 10 | | |
| PLACE | KANJI | VARIABLE ITEM | 8 | | |
| LANDSCAPE | KANJI | VARIABLE ITEM | 12 | | |
| | | | | | |
| | | | | | |

F I G. 4

F I G. 5

ELECTRONIC FILE APPARATUS CAPABLE OF STORING CODE DATA AND IMAGE DATA INTO OPTICAL MEMORY

This application is a continuation of application Ser. No. 07/607,625 filed Oct. 31, 1990 which is a continuation application of Ser. No. 07/168,485 filed Mar. 15, 1988, now abandoned.

BACKGROUND OF THE INVENTION

1. Field Of the Invention

This invention relates to an electronic file apparatus, and more particularly to an electronic file apparatus capable of storing code data into an optical memory.

2. Description of the Related Art

In present offices, magnetic disks as information recording medium for storing document data as prepared by word processors have been widely used. The magnetic disk of the current technology, however, cannot easily store a large amount of data including image data and code data. Usual documents include sentences, graphs, drawings and photographs. Image data needs a much larger amount of memory area than does code data.

Generally, the magnetic disk of the current technology has insufficient memory area for storing the retrieval data to retrieve the necessary data. For this reason, the items necessary for retrieval data are limited in number, resulting in less retrieval data being available, and hence requiring much time to retrieve the desired data. This problem becomes serious when the amount of the data is increased. In the magnetic disk, if necessary, the amount of retrieval data can be increased; however, the memory area for storing the retrieved data is reduced by the increase of the retrieval data.

Recently, image data filing apparatus have been developed for storing image data such as documents and drawings and processing this image data. Such an apparatus is disclosed in U.S. Pat. No. 4,661,988. This apparatus comprises a two-dimensional scanning device, a time counter, a character generator, a page buffer, and a CRT display. The scanning device optically reads image data from an original. The image data is recorded on an optical disk. The time counter generates time data representing the time, which is supplied to the character generator. The character generator produces character data corresponding to the time information. The character data is stored into the page buffer. Then, one page of the image data is automatically retrieved from the optical disk and stored into the page buffer temporarily. The image data is displayed by the CRT display, along with the character data. The optical disk is superior to the magnetic disk in the memory capacity and retrieval performance. In this apparatus, only the image data is stored into the optical disk. For storing the code data into the optical disk, it must be converted into the image data before its storage. This creates a problem when the optical disk is coupled with the current word processors and microcomputers.

SUMMARY OF THE INVENTION

Accordingly, an object of this invention is to provide an electronic file apparatus which can readily store and retrieve code data and image data, with a sufficient amount of memory capacity and good data retrieval.

According to one aspect of this invention, there is provided an apparatus for recording and reproducing data on and from an optical memory comprising memory means for storing code data, first processing means for outputting the code data from the memory means, means for adding a first retrieval data to the code data, means for recording the code data output by the first processing means and the first retrieval data added to the code data on the optical memory, means for indicating the retrieval data, and second processing means for retrieving the code data corresponding to the retrieval data indicated by the indicating means from the optical memory.

According to another aspect of this invention, there is provided an apparatus for recording data on an optical memory comprising memory means for magnetically storing a code data, means for outputting the code data from the memory means, and means for recording the code data output by the outputting means on the optical memory.

According to still another aspect of this invention, there is provided an apparatus for recording first and second data on an optical memory comprising first receiving means for receiving the first data to be processed, first recording means for recording the first data received from the first receiving means and first address data indicating the location of the first data to be recorded on the optical memory, the first address data having a first identification data representing the first type of the data, second receiving means for receiving the second data to be processed, and second recording means for recording the second data received from the second receiving means and second address data indicating the location of the second data to be recorded on the optical memory, the second address data having a second identification data representing the second type of the data.

BRIEF DESCRIPTION OF THE DRAWINGS

These and other features of this invention will become apparent from the following detailed description of exemplary embodiments thereof, as illustrated in the accompanying drawings, in which:

FIG. 1A is a block diagram schematically showing the overall arrangement of an electronic file apparatus according to an embodiment of the present invention;

FIG. 1B shows the screen of a CRT display unit, explaining how it is determined which data is input, image data or code data;

FIG. 2A is a plan view of an optical disk which can be used in the file apparatus according to the invention;

FIG. 2B is a plan view of another optical disk which can be used in the file apparatus according to the invention;

FIGS. 3A, 3B, 4 and 5 show views for explaining the retrieval data, in which FIG. 3A shows a format of retrieval title, FIG. 3B shows an data table, FIG. 4 shows a title structure, and FIG. 5 shows a control table;

FIGS. 6A and 6B show the formats of a retrieval title attached with an identification code used in another embodiment of this invention, in which FIGS. 6A and 6B show the retrieval title with "0" and "1", respectively.

DETAILED DESCRIPTION OF THE PREFERRED EMBODIMENTS

Figure 7A:
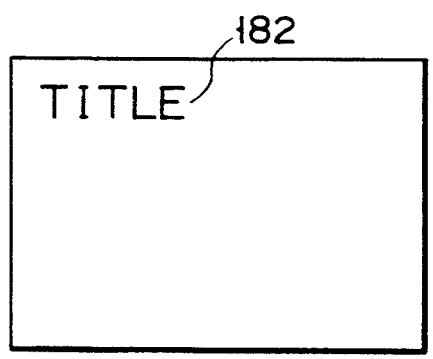
FIGS. 7A, 7B, and 7C show code data, image data, and edited data (i.e., a combination of code data and image data) being displayed on the CRT display unit, respectively.

Preferred embodiments of this invention will be described referring to the accompanying drawings.

FIG. 1A shows an overall arrangement of an electronic file apparatus. System bus 12 is coupled with CPU 14 as a control means. CPU 14 can perform a multi-task operation; it can control other components of the electronic file apparatus to record, retrieve, and edit data. CPU 14 is coupled with keyboard 16 for entering various types of data such as command data, and a pointing device 20, called a mouse, for moving a cursor on the screen. This pointing device 20 is provided with first and second push buttons (not shown) for indicating cursor positions.

System bus 12 is coupled with interface circuit 22 for the disk device, and main memory 24 for storing the program for CPU operation, for example. Interface circuit 22 is provided with a DMA (direct memory access circuit) (not shown), and interface circuit 22 is coupled with optical disk device 26 for storing image data, and with magnetic disk devices 28 and 30, which are heads. Optical disk device 26 is for sequentially storing image data into optical disk 34 as an optical data recording medium. The image data, for example, is supplied through CPU 14 from two-dimensional scanning device (scanner) 32 to be described in detail later.

Magnetic disk device 28 is coupled with magnetic disk 36, as used in word processors or personal computers, for example. This magnetic disk 36 may be a floppy disk device, for example. Magnetic disk device 38 prestores the retrieval data for retrieving data which is stored in optical disk 34 in accordance with an instruction from CPU 14, and also stores various types of programs used in image editing operation, for example. Magnetic disk 38 may be a hard disk, for example.

Assuming that the data input to the apparatus is the code data processed in a word processor, this code data is input from magnetic disk device 28 which has read the code data from a magnetic disk 36. To record this code data on optical disk 34, a retrieval title, which will be described later, is given to the code data, and then the operator gives a command for recording code data. As a result, the code data supplied from magnetic disk device 28 is stored via interface circuit 22 into main memory 24, and is then supplied to optical disk device 26 via interface circuit 22. Optical disk device 26 writes the code data in the code-data memory region (later described) of optical disk 34.

System bus 12 is coupled with page memory 40 which serves as a buffer memory, display memory 42, working display memory 44, enlarge/reduction circuit 46 for enlarging and reducing the image data, and aspect converter 48 for performing a vertical-horizontal conversion of the image data. These sections are coupled between system bus 12 and image bus 50.

Working display memory 44 stores character fonts (character patterns) necessary for converting code data into image data. The enlarge/reduction circuit 46 and aspect converter 48 are modulated. Display memory 42 is coupled with CRT display unit 18 via display controller 52.

Scanner 32 two-dimensionally scans a document, to obtain electrical signals representing the collected image data on the document. Scanner 32 is provided with operation section 32a for setting the parameters (processed data) of document size, density, read density, and the like, CPU 32b for controlling the operation of scanner 32, and memory 32c for storing various types of parameters as set by operation section 32a.

Printer 54 prints out image data collected by scanner 32, or the image data out from optical disk device 26. Scanner 32 and printer 54 are coupled with interface circuit 56 for scanner and encoding/decoding circuit (CODEC) 60 via the interface 56, 58 for printer 54. These circuits 60, 56 and 58 are modulated into a unit.

System bus 12 is coupled with universal communication processor (UCP) 62. UCP 62 is the interface for RS-232C, GPIB and SCSI. UCP 62 is coupled with business communication processor (BCP) 64. BCP 64 is for the interface for the local area network (LAN).

CPU 14 and interface circuit 22 form a control module (CPM). Main memory 24, page memory 40, display memory 42, working display memory 44, and display controller 52 form a memory module (MM). Enlarge/reduction circuit 46, aspect converter 48, interface circuits 56 and 58, and CODEC 60 form an image processing module (IPM). UCP 62 and BCP 64 form a communication control module (CCM).

The operation of the electronic file apparatus thus arranged when it processes code data and image, will be described.

The operation of the apparatus to first be described is the entering operation of code data or image data.

Before storing code data or image data into optical disk 34, the type of input data must be determined to be either code data or image data. The data type check is made by CPU 14. To be more specific, the input data type, code data or image data, is previously displayed on the screen of display unit 18. Seeing this, an operator operates keyboard 16 or pointing device 20 to move a cursor Cr to a desired type of the displayed data, code data or image data. As is shown in FIG. 1B, the cursor Cr is displayed below the words "CODE DATA" 18a, not below the words "IMAGE DATA" 18b, displayed on CRT display unit 18. Hence, CPU 14 determines that the code data must be input.

One of the methods used to identify whether code-type data or image-type data is input is to assign a specific code data area and a specific image data area to the memory area of optical disk 34. To be more specific, some tracks are assigned to the code data area, and some tracks are assigned to the image data area. Alternatively, some blocks are assigned to the code data, and some blocks to the image data.

FIGS. 3A and 3B show the formats of a retrieval title T and a data table PT, respectively, both being given to any item of data stored in optical disk 34. The retrieval title T includes data number Pn, and key data $K_1$, $K_2$ and $K_3$. The retrieval title T can include 20 key data items at most. These key data items are used to identify the pieces of data stored in optical disk 34. Therefore, when one of these key data items is specified, the data piece identified by this key data item is retrieved from optical disk 34. The retrieval title T and the image data in optical disk 34 are related in one-to-one correspondence by the data number Pn stored in retrieval title T and the image data recorded in data table PT. Therefore, if the retrieval title T is known, the image data in optical disk 34 can be retrieved. In the data table PT, Ma designates a record start address, Pl a length, and Ps a size of paper.

Key data $K_1$, $K_2$ and $K_3$ are defined by title structure TS shown in FIG. 4. In the title structure TS, $K_n$ designates the number of keys, $K_{na}$ the key name of each key data (vehicle, place, landscape, etc.), $T_1$ and $T_2$ the attribute of type 1 (value, character, kanji (Japanese ideogram)), and the attribute of type 2 (variable item and fixed item), and $C_n$ represents the number of digits.

FIG. 5 shows a control table for controlling retrieval title T, data table PT, and the like. This control table MT can control a maximum of 800 binders. The control table MT includes binder catalogue BC made up of a plurality of binders B, retrieval title T of each binder, and data table PT. Each binder B is made up of binder name Bn, title structure TS, address Ta of retrieval title T, and address Pa of data table PT. A maximum of 30,000 items of image data can be controlled by one binder.

There are two methods of controlling data. The first method is to store code data in one region of optical disk 34, and image data in another region of disk 34. The second method is to store both the code data and the image data in the same region of disk 34, and adding identification codes to the two types of data; thus distinguishing these types of data from each other. The first method is classified into to two schemes. In the first scheme the code data is stored in one track of disk 34, whereas the image data is stored in another track of disk 34. In the second scheme, the code data is stored in one block of disk 34, whereas the image data is stored in another block of disk 34.

FIG. 2A schematically shows how the code data and the image data are stored in different tracks of optical disk 34. As is shown in this figure, optical disk 34 comprises a substrate made of glass or synthetic resin in the form of a disk, and a layer of tellurium or bismuth coated on the substrate. A notch bearing an outline of a reference position mark $E_M$ cut near the center of the metal layer. The memory area of disk 34 consists of circular tracks which are concentric. (Alternatively, the memory area can consist of a spiral track.) Of these tracks, those in region Ec are used to store code data, and those in region Ei are used to store the image data. Regions Ec and Ei are not physically separated; they are defined by the control of CPU 14. Hence, by detecting the number of any track, it is determined which kind of data, code data or image data, is stored in this track.

FIG. 2B schematically shows another way of storing the code data and the image data in different tracks of optical disk 34. As is shown in FIG. 2B, the memory area of optical disk 34' is divided into halves Ec' and Ei'. The first half area Ec' consists of sectors 00 to 15, and the second half area Ei' consists of sectors 16 to 31. Optical disk 34' is identical to optical disk 34 shown in FIG. 2A, in all other aspects.

It will now be explained how the electronic file apparatus operate in order to store image data in optical disk 34.

First, the original containing the image data is placed in scanner 32. Scanner 32 reads the image data from the original, and supplies the data to CRT display unit 18. Thus, the image data is displayed on the screen of CRT display unit 18. The operator operates keyboard 16 or pointing device 20, thus moving the cursor Cr to below the words "IMAGE DATA" 18b being displayed on the screen. Then, CPU 14 determines that it is image data which is to be stored in optical disk 34.

Thereafter, size of document, a read density, and the like are set, and scanner 32 starts the scanning of the document. The image data collected by scanning the document is stored into page memory 40, via interface circuit 56, CODEC 60, aspect converter 48, and enlarge/reduction circuit 46. For displaying the image defined by the image data stored in page memory 40 by CRT display unit 18, it is transferred to display memory 42, from page memory 40. The image of this image data stored in display memory 42 is displayed on the screen of CRT display unit 18 under control of display controller 52.

The operation of the file apparatus when the image data stored in page memory 40 is stored into optical disk 34, will be described. Keyboard 16 or pointing device 20 is operated to direct the apparatus to store the image data displayed on the screen of CRT display unit 18 into optical disk 34. The designated image data as stored in page memory 40 is supplied to CODEC 60 via enlarge/reduction circuit 46 and aspect converter 48. In CODEC 60, the image data is encoded, and supplied again to optical disk device 26, via aspect converter 48, and the buffer memory in page memory 40, and interface circuit 22.

The image data is supplied to optical disk device 26. Device 26 converts the image data into recording signals. These signals are modulated by a laser beam (not shown). The laser beam is applied from the optical head (not shown) onto memory region Ei of optical disk 34. As a result, the image data is stored in this memory region Ei.

The operation of the file apparatus when the data input to the file apparatus is the code data, will be described. First, the original containing the code data is supplied to CRT display unit 18. Thus, the code data is displayed on the screen of CRT display unit 18. The operator operates keyboard 16 or pointing device 20, thus moving the cursor Cr to below the words "CODE DATA" 18a being displayed on the screen. Then, CPU 14 determines that it is code data which is to be stored in optical disk 34. The data is processed by and output from a word processor, is input to magnetic disk device 28 from magnetic disk 36. For storing the code data into optical disk 34, the operation is similar to that of the image data storing. Specifically, retrieval data T is set and the storing of the code data is designated. The code data read out from magnetic disk 36 by magnetic disk device 28 is stored into main memory 24 via interface circuit 22. The code data stored into main memory 24 is supplied to optical disk by optical disk device 26 and stored into the code data area Ec of optical disk 34.

The code data may be stored into optical disk 34, in the form of image data.

In this case, a command to convert the code data into the image data and store it into the optical disk is applied by operating keyboard 16 or pointing device 20, the code data read out from magnetic disk 36 through magnetic disk device 28 is first stored into main memory 24 via interface circuit 22. The data stored in the main memory 24 is supplied to working display memory 44, and the character font as specified by the input code data is read out from working display memory 44. This character font, i.e., image data, is stored into page memory 40. The image data converted from the code data may also be displayed by CRT display unit 18 via display memory 42 and display controller 52.

The image data stored in page memory 40 is supplied to CODEC 60 via enlarge/reduction circuit 46 and aspect converter 48. In this CODEC 60, the image data is encoded and then supplied to optical disk device 26 via enlarge/reduction circuit 46, aspect converter 48, the buffer memory in the page memory, and interface circuit 22. The image data is then supplied to optical disk 34 and stored into the image data area Ei.

The code data and image data as stored in optical disk 34 may be retrieved by entering the retrieval title into the file apparatus. More specifically, to retrieve the data, as described above, the type of the retrieved data, the code data or the image data, may be recognized by checking the memory area Ec or Ei storing the retrieved data. This check of the data type is made by CPU 14. Therefore, an operator does not check the type of the retrieval data.

The image data retrieved may be displayed and edited on the CRT screen. The code data may also be edited in the form of the image data on the CRT screen.

In this case, the code data read out from optical disk 34 is stored into main memory 24 via interface circuit 22. The code data stored in main memory 24 is supplied to working display memory 44, which in turn produces the character font defined by the input code data. The character font, i.e., the image data, is stored into display memory 42, and displayed on the CRT screen of display unit 18 under control of display controller 52. On the screen, various image editions such as cutting, movement, and rotation are possible.

The operation of the edited image data may be stored into optical disk 34 in a similar way when the code data is converted into the image data and stored into optical disk 34.

According to this embodiment, the code data may be directly stored into optical disk 34 of the electronic file apparatus. Therefore, optical disk 34 may be used not only as a usual image data recording medium, but also as a data recording medium for word processors, personal computers, and the like. Thus, the optical disk device of the file apparatus may be used as a key component of the OA (office automation) equipment.

The memory capacity of the optical disk is much larger than that of the magnetic disk. The apparatus with the optical disk may handle a great amount of data. Further, the retrieval data contains a great number of items of retrieval data, and that apparatus functions as a versatile apparatus handling the code data as well as the image data. The code data and the image data are stored in the different memory areas in optical disk 34. When reading out the data stored therein, an operator can easily recognize the data type by identifying the memory area storing that data. To display the read out data, if it is the code data, it is converted into the image data, and displayed. Therefore, when retrieving or displaying the data, an operator need not be aware of the type.

In the above-mentioned embodiment, the type of input data is designated by using keyboard 16 or pointing device 20. Alternatively, the data type can be verified by checking the terminals supplied with the data by CPU 14. To be more specific, when data is input to the file apparatus via interface circuit 22 coupled with magnetic disk device 28, the input data is code data. When it is input via interface circuit 56, it is image data. This method improves the operability of the apparatus since an operator can operate the apparatus without the need to know the type of data input.

In the above-mentioned embodiment, the optical disk memory area is divided and assigned to the code data and the image data, for recognizing the type of data. The same purpose may be attained by attaching identifying data to the code data and image data before the data is stored. More exactly, the identifying code is set in the data title for data retrieval, for example.

FIGS. 6A and 6B show a retrieval title T' as the retrieval data. The retrieval title T' and the image data in optical disk 34 are related in one-to-one correspondence by the data number Pn stored in the retrieval title T' and the image data recorded in an image data table (not shown). With this arrangement, if the retrieval title T' is known, the image data in optical disk 34 can be retrieved. Then, an identification code CI is set to the retrieval title T'. When CI is "0", the input data is the image data, and when it is "1", the data is the code data. In the case of the retrieval title T' shown in FIG. 6A, the CI is "0", and hence the data is the image data. In the case of FIG. 6B, it is "1", and it is the code data.

The remaining portion of the retrieval title T' (key data $K_1$ to $K_3$) and the data table, title structure, and the control table are similar to that of the first embodiment, and no further explanation will be given.

Following is a description of the retrieval title T' with identification code CI being used, and the input data being stored into the optical disk. For simplicity of explanation, only the different portions from the first embodiment will be described.

In order to store image data in optical disk 34, the original containing the image data is placed in scanner 32. Scanner 32 reads the image data from the original, and supplies the data to CRT display unit 18. Thus, the image data is displayed on the screen of CRT unit 18. The operator operates keyboard 16 or pointing device 20, thus moving the cursor to below the words "IMAGE DATA" being displayed on the screen. Then, CPU 14 determines that it is image data which is to be stored in optical disk 34.

When the image data stored in page memory 40 is stored into optical disk 34, the key data of retrieval title T' is set, and keyboard 16 or pointing device 20 is operated to enter a command to store the image data displayed by CRT display unit 18 into optical disk 34. "0" is set in the identification code CI of retrieval title T'. The image data stored in page memory 40 is supplied to CODEC 60 via enlarge/reduction circuit 46. In CODEC 60, the image data is coded, and supplied to optical disk 34 again, via enlarge/reduction circuit 46, aspect converter 48, the buffer memory in the page memory, interface circuit 22, and optical disk device 26.

When the data input to the file apparatus is the code data, the code data as processed by a word processor, for example, is input to magnetic disk device 28 from magnetic disk 36. For storing the code data into optical disk 34, the operation proceeds as in the case of storing the image data. First, "1" is set in the CI of the retrieval title T'. The code data read out from magnetic disk 36 through magnetic disk device 28 is stored into main memory 24 via interface circuit 22. The code data stored in this main memory 24 is supplied to optical disk device 26 via interface circuit 22, and to optical disk 34 and stored therein.

The code data may be stored in the optical disk in the form of image data. In this case, necessary key data is entered by keyboard 16. For example, the conversion of the code data into the image data and storing of it into the optical disk are designated; "0" representing the image data is set in the CI of the retrieval title T'. The code data read out from magnetic disk 36 through magnetic disk device 28 is first stored into main memory 24 via interface circuit 22. The code data stored in main memory 24 is supplied to working display memory 44, which in turn produces the character font corresponding to the input code data. The character font is stored into page memory 40.

The code data and image data stored in optical disk 34 can be retrieved by inputting retrieval title T'. In this case, the identification code CI of the retrieval title T' of the retrieved data enables CPU 14 to decide if the data is the code data or the image data.

As described above, in this embodiment, different identification codes are assigned to the code data and image data, respectively. In reading out the data from the optical disk, the type of that data, code data or image data, can be readily identified by checking the code identification code of the read out data.

Since different identification codes are assigned to the code data and the image data, either data can be identified by referring to the identification code, regardless of whether it is stored in an optical disk, alone or together with the other type of data.

While identification code CI is set in retrieval title T' in the above-mentioned embodiment, it may be set in the image data table.

The electronic file apparatus according to the present invention can convert code data to image data. Therefore, data can be edited by the file apparatus in the following specific way:

Image data and code data can be combined into one document in the following manner. Assume that the code data has been prepared by operating a word processor and stored in optical disk 36. The operator operates keyboard 16 or pointing device 20, thus moving the cursor Cr to below the words "CODE DATA" 18a being displayed on the screen of CRT display unit 18. Then, CPU 14 determines that it is code data which is to be stored in optical disk 34.

Thereafter, the code data is read from magnetic disk 36 by means of magnetic disk device 28. The code data is then stored into main memory 24 via interface circuit 22. The code data is read out from memory 24 and written into working display memory 42. More specifically, the character data corresponding to the code data is stored into memory 42. The character data or the code data, e.g., the word "TITLE" 182, is displayed on the screen of CRT display unit 18, as is shown in FIG. 7A, under the control of display controller 52.

Figure 7C:
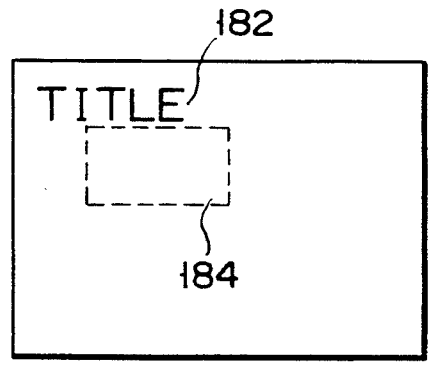
Figure 7B:
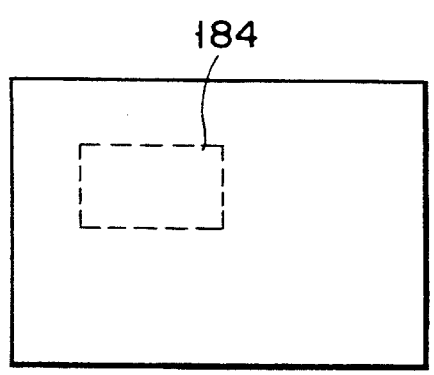

Meanwhile, the image data 184 shown in FIG. 7B is read by scanner 32. The operator operates keyboard 16 or pointing device 20, thus moving the cursor Cr to below the words "IMAGE DATA" 18b being displayed on the screen of CRT display unit 18. Then, CPU 14 determines that it is image data which is to be stored in optical disk 34. The image data is thus stored into the buffer memory (not shown) provided within page memory 40 through interface circuit 56, CODEC 60, aspect converter 48, and enlarge/reduction circuit 46. Simultaneously, the character data is supplied from working display memory 44 to the buffer of page memory 40. Hence, a logical sum of the character data shown in FIG. 7A and the image data shown in FIG. 7B is stored into the buffer memory. As a result, the image data shown in FIG. 7C, which is a combination of the word "TITLE" 182 and the image data 184 shown FIG. 7B is stored in display memory 42, and is displayed on the screen of CRT display unit 18.

In order to print the combined data stored in display memory 42 and displayed by CRT display unit 18, the operator operates keyboard 16 or pointing device 20, thereby supplying this data from page memory 40 to printer 54 via enlarge/reduction circuit 46, interface circuit 58, and the like. Printer 54 prints the data shown in FIG. 7C on a sheet of paper.

The image data read from optical disk 34 can be stored in page memory 40, in which case scanner 32 is not used. Further, scanner 52 can be replaced by a facsimile device.

The combined data, which comprises code data and image data, can be stored in optical disk 34.

The editing of image data is not limited to such combining of different types of data as has been described above. The image produced from code data can be retrieved whenever necessary, and a part of this image data can be deleted if necessary.

As has been described above, any data input to the file apparatus, code data or image data, is stored in an optical disk under the control of a control means. The code data or the image data, whichever is required, can be quickly retrieved from the optical disk. Since a great amount of data can be stored in each optical disk, and any item of data can be quickly retrieved from the disk, the electronic file apparatus according to the present invention can store a multitude of data, and can retrieve each data item at high speed.

What is claimed is:

1. An apparatus for recording and reproducing data on and from an optical memory having regions for recording data by light only, comprising:
    memory means for storing code data received from a magnetic recording medium and image data read from an optical device;
    first processing means for outputting the code data and the image data from the memory means;
    means for adding a first retrieval data to the code data output from the first processing means and for adding a second retrieval data to the image data output from the first processing means, said first retrieval data having a first identification data representing the code data and said second retrieval data having a second identification data representing the image data;
    means for recording the first retrieval data added to the code data from the adding means on the optical memory and for recording the second retrieval data added to the image data from the adding means on the optical memory;
    means for designating the first and second retrieval data; and
    second processing means for retrieving the code data added to the first retrieval data and retrieving the image data added to the second retrieval data from the optical memory recorded by said recording means.

2. An apparatus according to claim 1, wherein said designating means comprises a keyboard means.

3. An apparatus according to claim 1, wherein said designating means comprises a pointing device means.

4. An apparatus according to claim 1, wherein said memory means comprises:
    first memory means for storing code data; and
    second memory means for storing image data.

5. An apparatus according to claim 4, wherein said first processing means comprises:
    first outputting means for outputting the code data from said first memory means; and
    second outputting means for outputting the image data from said second memory means.

6. An apparatus for recording both a first data and a second data on an optical memory by light, comprising:

first data generating means for generating the first data;

second data generating means for generating the second data;

first receiving means for receiving the first data to be processed from said first data generating means;

means for generating a first address data indicating the location of the first data to be recorded on a first area of the optical memory, the first address data having a first identification data representing the first data;

first adding means for adding a first address data from the first address generating means to the first data received from the first receiving means;

first area recording means for recording the first data added to the first address data from the first adding means on the first area of the optical memory;

second receiving means for receiving the second data to be processed from the second data generating means;

means for generating second address data indicating the location of the second data to be recorded on a second area of the optical memory, the second address data having a second identification data representing the second data;

second adding means for adding a second address data from the second address generating means to the second data received from the second data generating means; and second area recording means for recording the second data added to the second address data from the second adding means on the second area of the optical memory.

7. An apparatus according to claim 6, wherein said first data is constituted by image data, and said second data is constituted by code data.

8. An apparatus according to claim 7, wherein said first receiving means includes a two-dimensional scanning means, and said second receiving means includes a magnetic recording medium.

9. An apparatus according to claim 8, further comprising means for converting the code data received by the second receiving means into image data to be recorded by the first area recording means.

10. An apparatus according to claim 7, wherein said first receiving means includes means for processing image data supplied from a communication line, and said second receiving means includes a magnetic recording medium.

11. An apparatus according to claim 10, further comprising means for converting the code data received by the second receiving means into image data to be recorded by the first area recording means.

12. An apparatus for recording both image data and code data on an optical memory by light, comprising:

designating means for designating image data or code data to be processed;

first receiving means for receiving image data to be processed when the image data is designated by the designating means, the first receiving means including a facsimile;

means for generating a first address data indicating the location of the image data to be recorded on a first area of the optical memory, the first address data having a first identification data representing the image data;

first adding means for adding the first address data from the first address generating means to the image data received from the first receiving means;

first area recording means for recording the image data and the first address data added by the first adding means on the first area of the optical memory;

second receiving means for receiving code data to be processed when the code data is designated by the designating means, the second receiving means including a magnetic recording medium;

means for generating second address data indicating the location of the code data to be recorded on a second area of the optical memory, the second address data having a second identification data representing the code data;

second adding means for adding the second address data from the second address data generating means to the code data received from the second receiving means;

second area recording means for recording the code data and the second address data added by the second adding means on the second area of the optical memory;

means for converting the code data received by the second receiving means into image data to be recorded by the first area recording means; and means for displaying the image data converted from the code data by the converting means.

13. An apparatus according to claim 12, wherein the first and second receiving means each include a plurality of terminals, and further comprising a means for deciding if the data received by the plurality of terminals is image data or code data by deciding which of the terminals receives the data.

14. An apparatus for recording both image data and code data on an optical memory by light, comprising:

designating means for designating image data or code data to be processed;

first receiving means for receiving image data to be processed when the image data is designated by the designating means, the first receiving means including a two-dimensional scanner;

means for generating a first address data indicating the location of the image data to be resolved on a first area of the optical memory, the first address data having a first identification data representing the image data;

first adding means for adding the first address data from the first address generating means to the image data received from the first receiving means;

first area recording means for recording the image data and the first address data added by the first adding means on the first area of the optical memory;

second receiving means for receiving code data to be processed when the code data is designated by the designating means, the second receiving means including a magnetic recording medium;

means for generating second address data indicating the location of the code data to be recorded on a second area of the optical memory, the second address data having a second identification data representing the code data;

second adding means for adding the second address data from the second address data generating means to the code data received from the second receiving means;

second area recording means for recording the code data and the second address data added by the second adding means on the second area of the optical memory;

means for converting the code data received by the second receiving means into image data; and means for displaying the image data converted from the code data by the converting means.

15. Apparatus according to claim 14, wherein the first and second receiving means each include a plurality of terminals and further comprising a means for deciding if the data received by the plurality of terminals is image data or code data by deciding which of the terminals receives the data.

16. An apparatus for recording and reproducing both image data and code data on and from an optical memory by light, comprising:

first generating means for generating code data;

second generating means for generating image data;

memory means for storing code data generated by the first generating means and image data generated by the second generating means;

first processing means for outputting the code data and the image data from the memory means;

means for adding a first retrieval data to the code data output from the first processing means and for adding a second retrieval data to the image data output from the first processing means;

means for recording the first retrieval data added to the code data from the adding means on the optical memory and for recording the second retrieval data added to the image data from the adding means on the optical memory;

means for designating the first and second retrieval data added by the adding means; and second processing means for retrieving the code data added to the first retrieval data and retrieving the image data added to the second retrieval data from the optical memory recorded by said recording means.

17. An apparatus according to claim 16, wherein said first generating means includes a magnetic recording medium, and said second generating means includes a two-dimensional scanning means.

18. An apparatus according to claim 16, further comprising means for converting the code data generated by the first generating means into image data, and means for storing the image data converted by the converting means to the memory means.

* * * * *